United States Patent
Guarnaccia et al.

(10) Patent No.: US 9,727,306 B2
(45) Date of Patent: Aug. 8, 2017

(54) BI-SYNCHRONOUS ELECTRONIC DEVICE WITH BURST INDICATOR AND RELATED METHODS

(71) Applicant: STMICROELECTRONICS S.r.l., Agrate Brianza (IT)

(72) Inventors: Giuseppe Guarnaccia, Francofonte (IT); Salvatore Marco Rosselli, Catania (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 292 days.

(21) Appl. No.: 14/508,126

(22) Filed: Oct. 7, 2014

(65) Prior Publication Data

US 2016/0099031 A1    Apr. 7, 2016

(51) Int. Cl.
    *G06F 5/10*    (2006.01)
(52) U.S. Cl.
    CPC .......... *G06F 5/10* (2013.01); *G06F 2205/102* (2013.01); *G06F 2205/106* (2013.01)
(58) Field of Classification Search
    CPC . G06F 5/10; G06F 2205/102; G06F 2205/106
    See application file for complete search history.

(56) References Cited

U.S. PATENT DOCUMENTS

| | | | |
|---|---|---|---|
| 4,873,703 A | 10/1989 | Crandall et al. | |
| 5,357,613 A | 10/1994 | Cantrell et al. | |
| 5,499,344 A | 3/1996 | Elnashar et al. | |
| 5,539,739 A | 7/1996 | Dike et al. | |
| 5,598,113 A | 1/1997 | Jex et al. | |
| 5,600,824 A | 2/1997 | Williams et al. | |
| 6,055,285 A * | 4/2000 | Alston ................... | H04J 3/062 375/356 |
| 6,263,410 B1 | 7/2001 | Kao et al. | |
| 6,516,420 B1 | 2/2003 | Audityan et al. | |
| 6,715,010 B2 | 3/2004 | Kumata | |
| 6,748,039 B1 | 6/2004 | Bates | |

(Continued)

FOREIGN PATENT DOCUMENTS

EP    0798630 A1    10/1997

OTHER PUBLICATIONS

Cummings, "Simulation and Synthesis Techniques for Asynchronous FIFO Design," SNUG, San Jose, 2002, pp. 1-23.

(Continued)

*Primary Examiner* — Eric Oberly
(74) *Attorney, Agent, or Firm* — Slater Matsil, LLP

(57) ABSTRACT

A bi-synchronous electronic device may include a FIFO memory circuit configured to store data, and a first digital circuit coupled to the FIFO memory circuit and configured to operate based upon a first clock signal and a write pointer, write a data burst to the FIFO memory circuit, thereby causing a jump in the write pointer to a new position, and write a burst indicator associated with the new position in the FIFO memory circuit. The bi-synchronous electronic device may include a second digital circuit coupled to the FIFO memory circuit and configured to operate based upon a second clock signal different from the first clock signal, read from the FIFO memory circuit based upon a read pointer, and synchronize the read pointer to the write pointer based upon the burst indicator.

22 Claims, 5 Drawing Sheets

(56) References Cited

U.S. PATENT DOCUMENTS

| | | | |
|---|---|---|---|
| 7,003,423 | B1 | 2/2006 | Kabani et al. |
| 7,152,136 | B1 | 12/2006 | Charagulla |
| 7,272,677 | B1 | 9/2007 | Venkata et al. |
| 7,310,396 | B1 | 12/2007 | Sabih |
| 2002/0184453 | A1 | 12/2002 | Hughes et al. |
| 2002/0188905 | A1* | 12/2002 | Hollums ............ G06F 11/1008 714/752 |
| 2003/0097526 | A1 | 5/2003 | Chiu et al. |
| 2003/0105607 | A1 | 6/2003 | Jones et al. |
| 2003/0217244 | A1 | 11/2003 | Kelly |
| 2004/0193821 | A1 | 9/2004 | Ruhovets et al. |
| 2005/0125590 | A1 | 6/2005 | Li et al. |
| 2006/0047754 | A1 | 3/2006 | Wenkata Subramanian et al. |
| 2006/0164902 | A1 | 7/2006 | Fung |
| 2007/0177701 | A1 | 8/2007 | Thanigasalam |
| 2012/0151243 | A1* | 6/2012 | Ono ......................... G06F 5/12 713/400 |
| 2013/0002315 | A1* | 1/2013 | Boucard ............... G06F 13/385 327/141 |

OTHER PUBLICATIONS

Panades et al., "Bi-Synchronous FIFO for Synchronous Circuit Communication Well Suited for Network-on-Chip in GALS Architectures," First International Symposium on Networks-on-Chip, May 7-9, 2007, Abstract only.

\* cited by examiner

BI-SYNCHRONOUS ELECTRONIC DEVICE WITH BURST INDICATOR AND RELATED METHODS

TECHNICAL FIELD

The present disclosure relates to the field of electronic devices, and, more particularly, to a bi-synchronous electronic device with a first-in-first-out memory circuit and related methods.

BACKGROUND

In integrated circuits (ICs), the electrical heart beat of the circuitry is the clock signal and it regulates the pace of operation for many circuits therein. In some relatively complex ICs, such as a system-on-chip (SoC), there may be complex systems for communication between different modules of an IC (for example, a processing unit, memories, peripherals, and other dedicated units) so as to ensure observance of the specifications of performance of the system. Indeed, in certain SoC applications, some of the components may operate with different clock speeds.

In some SoC applications, the IC may include first-in-first-out (FIFO) queues between devices with different clock frequencies. For example, a FIFO queue can be set between a first device, such as a microprocessor, which writes information in the FIFO queue and a second device, such as a peripheral or a second microprocessor, which reads the information from the FIFO queue. Each device reads and writes data in the FIFO queue with a rate equal to that of its own clock. The presence of the FIFO queue serves to enable co-existence of the two domains in the SoC with different clock frequencies. The FIFO queue serves as a buffer for regulating the flow of data between devices that work at different clock speeds.

Referring to FIGS. 1-2, an approach to a FIFO memory queue 200 is now described. The FIFO memory queue 200 includes a first write logic circuit 201 operating based upon a first clock signal, a second read logic circuit 202 operating based upon a second clock signal, a memory core 203 coupled between the logic circuits, and a pointer synchronization circuit 204 also coupled between the logic circuits.

The pointer synchronization circuit 204 includes a write enable block 210 receiving a write enable signal from the first write logic circuit 201, a first binary-to-Gray encoder block 211 coupled to the write enable block, a first flip-flop block 212 coupled to the first binary-to-Gray encoder block, first and second blocks 213a-213b coupled in succession to the first flip-flop block, a first Gray-to-binary encoder block 223 coupled to the second block, and a first compare block 214 coupled to the first Gray-to-binary encoder block and outputting a FIFO empty signal. The pointer synchronization circuit 204 includes a read enable block 221 receiving a read pulse from the second read logic circuit 202, a second Gray-to-binary encoder block 222 coupled to the read enable block, a second binary-to-Gray encoder block 220 coupled to the read enable block, a second flip-fop block 219 coupled to the second binary-to-Gray encoder block, first and second blocks 218a-218b coupled in succession to the second flip-flop block, a third Gray-to-binary encoder block 217 coupled to the second block, a fourth Gray-to-binary encoder block 215 coupled to the first flip-flop block 212, and a second compare block 216 coupled to the third Gray-to-binary encoder block and outputting a FIFO full signal to the first write logic circuit 201.

In this FIFO memory queue 200, the memory core 203 is written in the first clock domain, and only one location can be pushed in the memory core in a write-domain cycle. The read domain retrieves data from the memory core 203 in the second-clock domain, one location per read-domain cycle.

SUMMARY

Generally speaking, a bi-synchronous electronic device may include a FIFO memory circuit configured to store data, and a first digital circuit coupled to the FIFO memory circuit and configured to operate based upon a first clock signal and a write pointer, write a data burst to the FIFO memory circuit, thereby causing a jump in the write pointer to a new position, and write a burst indicator associated with the new position in the FIFO memory circuit. The bi-synchronous electronic device may include a second digital circuit coupled to the FIFO memory circuit and configured to operate based upon a second clock signal different from the first clock signal, read from the FIFO memory circuit based upon a read pointer, and synchronize the read pointer to the write pointer based upon the burst indicator.

In some embodiments, the first digital circuit may be configured to write the burst indicator as a flag bit. In other embodiments, the first digital circuit may be configured to write the burst indicator as a field value. The field value may comprise a memory value, and a burst value indicating a length of the data burst. The second digital circuit may be configured to read multiple field values from the FIFO memory circuit in parallel. The first digital circuit may be configured to write at a plurality of locations in the FIFO memory circuit in a single clock cycle of the first clock signal.

More specifically, the jump in the write pointer to the new position may comprise a non-consecutive jump from a current position. The memory circuit may comprise processing circuitry, and a memory core coupled to the processing circuitry and configured to store data for transfer between the first and second digital circuits. For example, the FIFO memory circuit may comprise a 16-128 bit bi-synchronous FIFO memory.

Another aspect is directed to a method of operating a bi-synchronous electronic device comprising a FIFO memory circuit. The method may include using a first digital circuit coupled to the FIFO memory circuit to operate based upon a first clock signal and a write pointer, write a data burst to the FIFO memory circuit, thereby causing a jump in the write pointer to a new position, and write a burst indicator associated with the new position in the FIFO memory circuit. The method may include using a second digital circuit coupled to the FIFO memory circuit to operate based upon a second clock signal different from the first clock signal, read from the FIFO memory circuit based upon a read pointer, and synchronize the read pointer to the write pointer based upon the burst indicator.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and prime notation is used to indicate similar elements in alternative embodiments.

In SoC products, such as application processors, microcontrollers, circuitry for mobile and multimedia applications (smartphone/tablets, Set-top Box, Home Gateway, etc.), it is typical to partition the digital logic into different domains. Clock domains are digital sections of the SoC in which the synchronous sequential logic is driven by a dedicated clock. Subsequently, communication between clock domains is designed through bi-synchronous, multi-synchronous or asynchronous techniques that allow signals to cross from the transmitter to the receiver in a safe way (i.e. the signals must be received stable and mutually correlated). In order to guarantee such signals' integrity, clock domain crossing can be poor in terms of latency, expensive in terms of area occupation, dissipative in dynamic power and complex to manage. This present disclosure may offer an approach to perform faster clock-domain crossing through a custom multi-clock FIFO and a general approach applicable in several semiconductor products, especially when traffic shapes are hard to predict.

Figure 1:
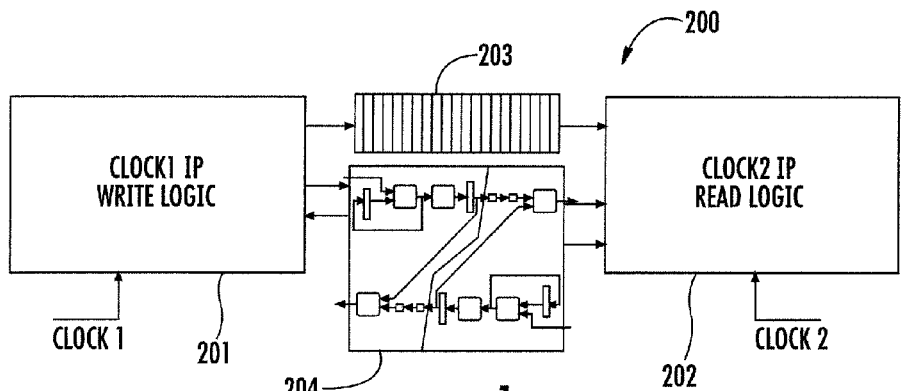
FIG. 1 is a schematic diagram of a FIFO memory queue, according to the prior art.
Figure 2:
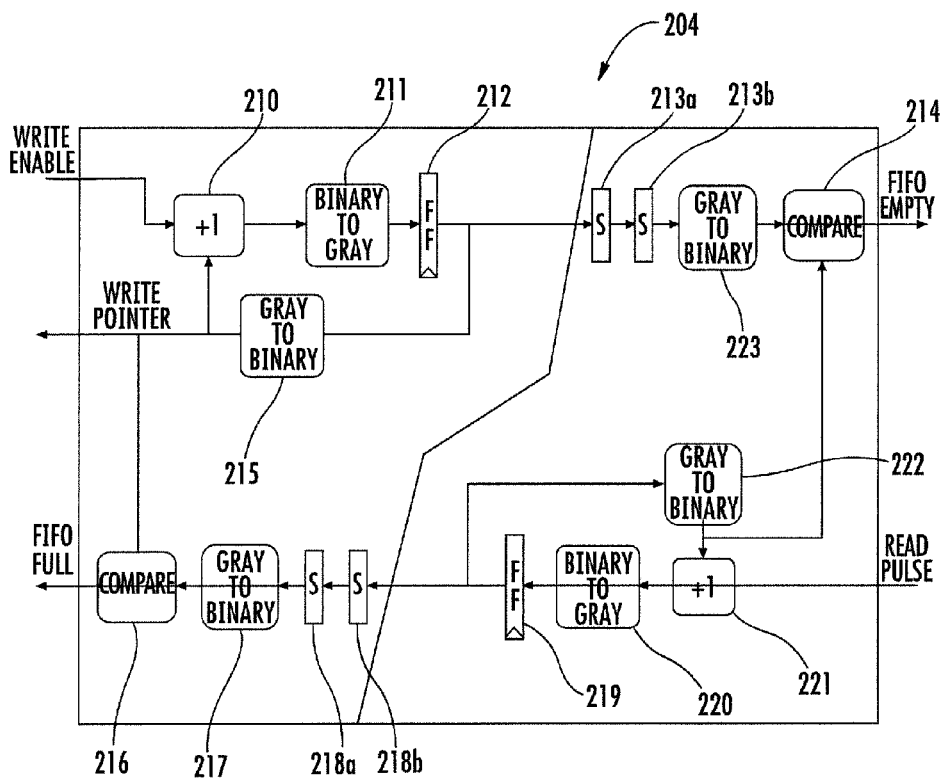
FIG. 2 is a schematic diagram of the pointer synchronization circuit from the FIFO memory queue of FIG. 1.
Figure 3:
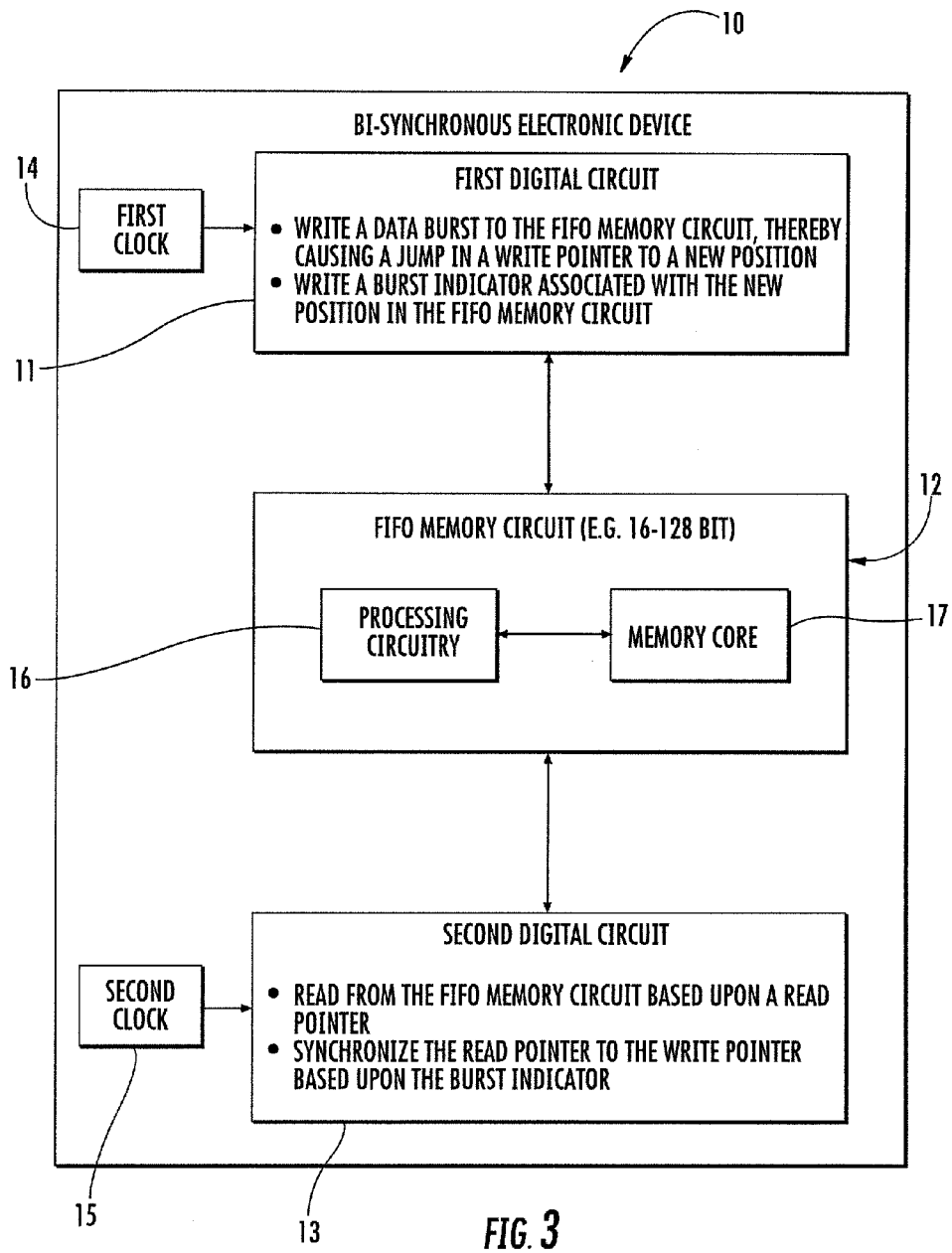
FIG. 3 is a schematic diagram of a bi-synchronous electronic device, according to the present disclosure.

Referring initially to FIG. 3, a bi-synchronous electronic device 10 according to the present disclosure is now described. The bi-synchronous electronic device 10 illustratively includes a FIFO memory circuit 12 configured to store data, a first clock 14 generating a first clock signal, and a first digital circuit 11 coupled to the FIFO memory circuit and the first clock. The bi-synchronous electronic device 10 illustratively includes a second clock 15 generating a second clock signal, and a second digital circuit 13 coupled to the FIFO memory circuit 12 and the second clock.

The memory circuit 12 illustratively includes processing circuitry 16, and a memory core 17 coupled to the processing circuitry and configured to store data for transfer between the first and second digital circuits 11, 13. For example, the FIFO memory circuit 12 may comprise a 16-128 bit bi-synchronous FIFO memory.

The first digital circuit 11 is configured to operate based upon the first clock signal and a write pointer. As will be appreciated by those skilled in the art, the write pointer relates to a current memory location in the memory core 17 being written. The first digital circuit 11 is configured to write a data burst to the FIFO memory circuit 12, thereby causing a jump in the write pointer to a new position, and write a burst indicator associated with the new position in the FIFO memory circuit. More specifically, the jump in the write pointer to the new position may comprise a non-consecutive jump from a current position, i.e. the jump causes an increment in violation of Gray encoding rules.

The second digital circuit 13 is coupled to the FIFO memory circuit 12 and configured to operate based upon the second clock signal different from the first clock signal, read from the FIFO memory circuit based upon a read pointer, and synchronize the read pointer to the write pointer based upon the burst indicator. As will be appreciated by those skilled in the art, the read pointer relates to a current memory location in the memory core 17 being accessed.

Figure 4A:
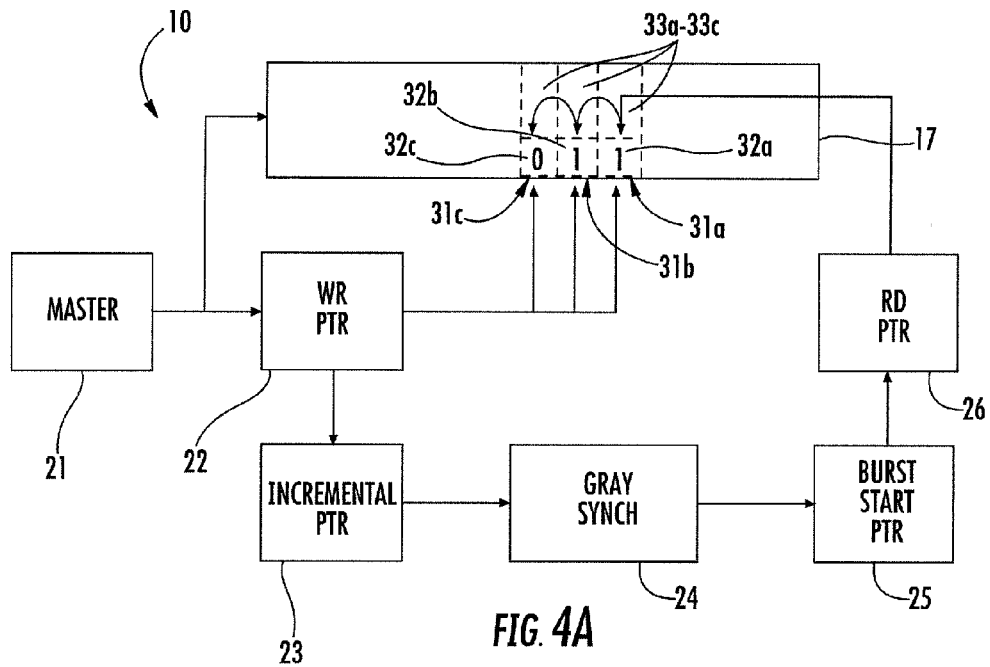
FIGS. 4A-4C are diagrams illustrating operation of the bi-synchronous electronic device of FIG. 3.
Figure 4B:
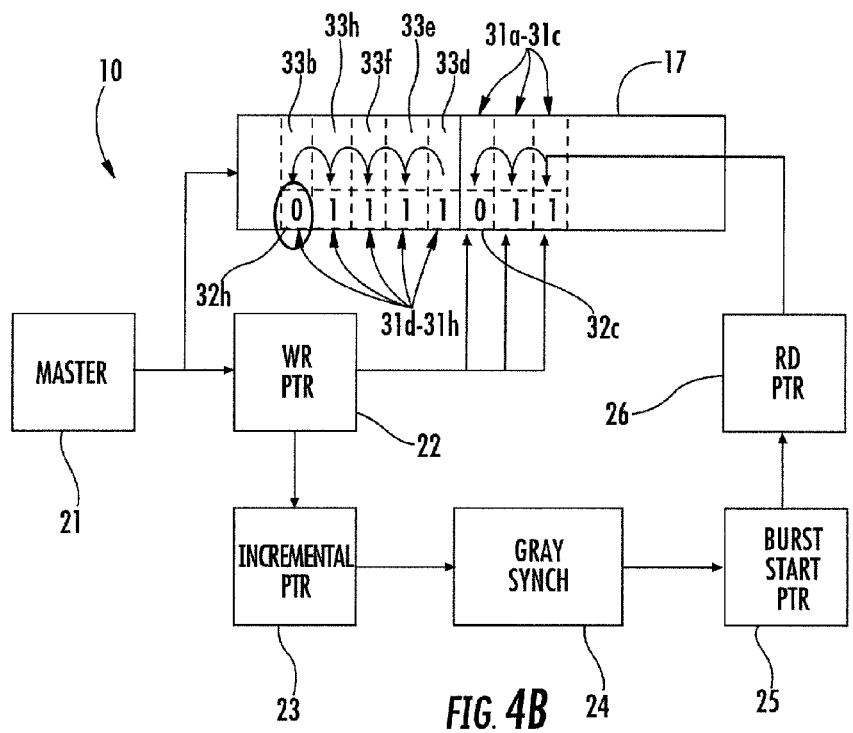

Referring additionally to FIGS. 4A and 4B, in the illustrated embodiment, the first digital circuit 11 is configured to write the burst indicator as a flag bit (e.g., the illustrated "0" valued bit). This permits the first digital circuit 11 to write to a plurality of memory locations at once in the FIFO memory circuit 12. The memory core 17 illustratively includes a plurality of memory locations 31a-31h. Each memory location 31a-31h illustratively includes a flag bit 32a-32h for serving as the burst indicator, and a memory value 33a-33h. In the illustrated embodiments, the memory core 17 is written to from right to left.

The bi-synchronous electronic device 10 illustratively includes a master block 21, a write pointer block 22 coupled to the master block, an incremental pointer block 23 coupled to the write pointer block, a Gray synchronizer block 24 coupled to the write pointer block, a burst start pointer block 25 coupled to the Gray synchronizer block, and a read pointer block 26 coupled to the memory core 17. In FIG. 4A, the first three memory locations 31a-31c are written to in one cycle, i.e. the write burst from the first digital circuit 11 is 3 memory locations long. In the third memory location 31c, the flag bit 32c is set to a zero value to serve as a burst indicator. In this embodiment, the flag bit 32c serves as a marker for the end of the burst written by the first digital circuit 11.

In particular, the master block 21 is a schematic representation of any request-based write-side logic. The write pointer block 22 always points at the first empty location and moves according to the filling of the FIFO (subsequently it can jump). The incremental pointer block 23 is ideally a copy of the write pointer, but it cannot jump; it is incremented by one at a cycle until it reaches the write pointer value and is required to provide a safe Gray sequence. The Gray synchronizer block 24 is a typical bus synchronizer fed with the incremental pointer towards the read domain. The burst start pointer block 25 is the synchronized version of the incremental pointer; it is used by the read domain to detect a new legal location in the FIFO. The read pointer block 26 exploits the information carried by the burst-start pointer to retrieve legal data within the FIFO. Once a convenient tag/field is found at the given location, the burst boundaries are detected so that the read pointer can jump (whereas the incremental and burst-start ones could not). The write and read pointer are the effective FIFO pointers, while the incremental and burst-start ones are convenient logic required by the proposed synchronization mechanism.

In FIG. 4B, the first digital circuit 11 has written two separate data bursts to the memory core 17. The first data burst is identical to the data burst from FIG. 4A, and the second data burst occupies the subsequent five memory locations 31d-31h, which were also written in one cycle. In the fifth memory location 31h, the flag bit 32h is set to a zero value to serve as a burst indicator. The flag bit 32h (highlighted with an oval) serves as a marker for the end of the second data burst written by the first digital circuit 11.

In this embodiment, the read side (i.e. the second digital circuit 13) is allowed to keep reading the data burst from the burst start pointer block 25 until the first zero-tagged memory location (corresponding to the burst end). Any following burst can be read as soon as the burst start pointer overcomes the previous burst boundary known to the read size. This is enabled by the first digital circuit 11 (i.e. the write domain) providing each data burst delimited by a "zero flag."

Figure 4C:
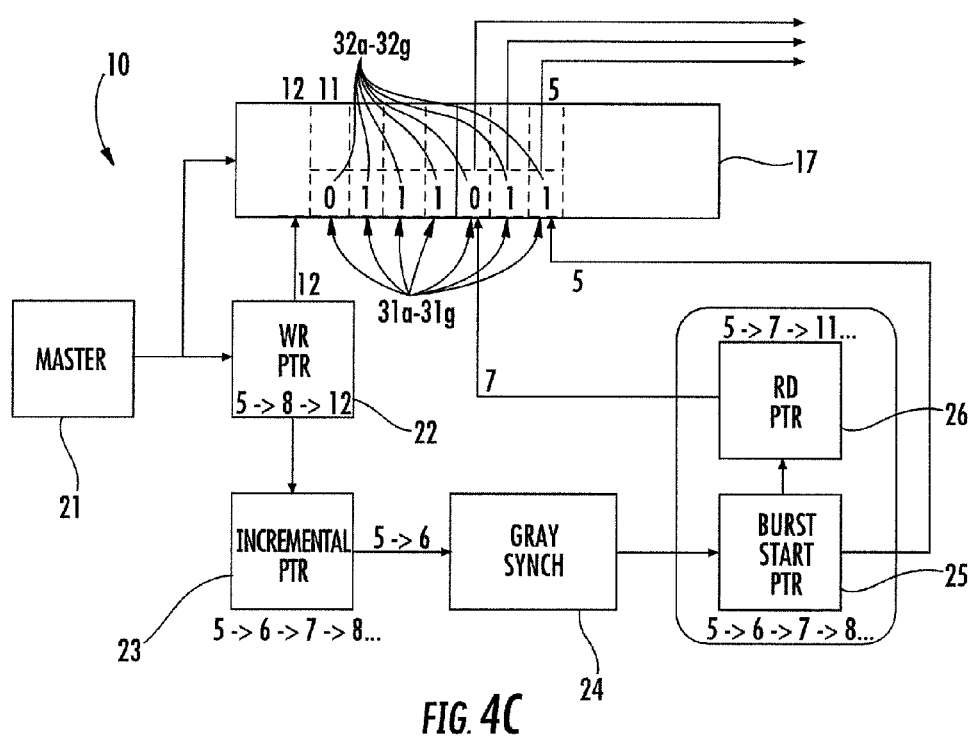

In FIG. 4C, the first digital circuit 11 has written two separate bursts to the memory core 17. The first data burst is identical to the burst from FIG. 4A, and the second data burst occupies the subsequent four memory locations 31$d$-31$g$, which were also written in one cycle. The data burst flag bits are written at 32$c$ and 32$g$. In this illustrated embodiment, the jumps in the write pointer block 22 are indicated as going from 5→8→12, the values of the incremental pointer block 23 are indicated as 5→6→7→8, the values of the burst start pointer block 25 are indicated as 5→6→7→8, and the values of the read pointer block 26 are indicated as 5→7→11.

This figure shows the write pointer used to load the data in the memory core 17 jumping from memory location 5 to 8. The incremental pointer block 23 follows the write pointer block 22 one step at a time (5, 6, 7, 8), and the write pointer block can write more bursts in the meanwhile (jumping to 12). The read size recognizes the burst start pointer (5) when the synchronized pointer exceeds the last read location (4). The extra field allows the read side (i.e. the second digital circuit 13) to fetch data from the FIFO up to location 7 (corresponding to the first location tagged with zero right after the burst start pointer). The second burst can be read as soon the burst start pointer reaches location 8.

Advantageously, the bi-synchronous electronic device 10 may improve the performance of the synchronization mechanism and integrate the multi-clock FIFO in an upsize data converter. In particular, the bi-synchronous electronic device 10 may perform better than the prior art in terms of bandwidth use. The flexibility of the disclosed approach makes it suitable for several traffic categories in multi-clock designs. Such improvements may be valuable in many fields of application and particularly for SoC peripherals, whose traffic is often driven by the user, which are difficult to predict and can require some data manipulation (e.g. data size conversion).

Another aspect is directed to a method of operating a bi-synchronous electronic device 10 comprising a FIFO memory circuit 12. The method may include using a first digital circuit 11 coupled to the FIFO memory circuit 12 to operate based upon a first clock signal and a write pointer, write a data burst to the FIFO memory circuit, thereby causing a jump in the write pointer to a new position, and write a burst indicator associated with the new position in the FIFO memory circuit. The method may include using a second digital circuit 13 coupled to the FIFO memory circuit 12 to operate based upon a second clock signal different from the first clock signal, read from the FIFO memory circuit based upon a read pointer, and synchronize the read pointer to the write pointer based upon the burst indicator.

Figure 5:
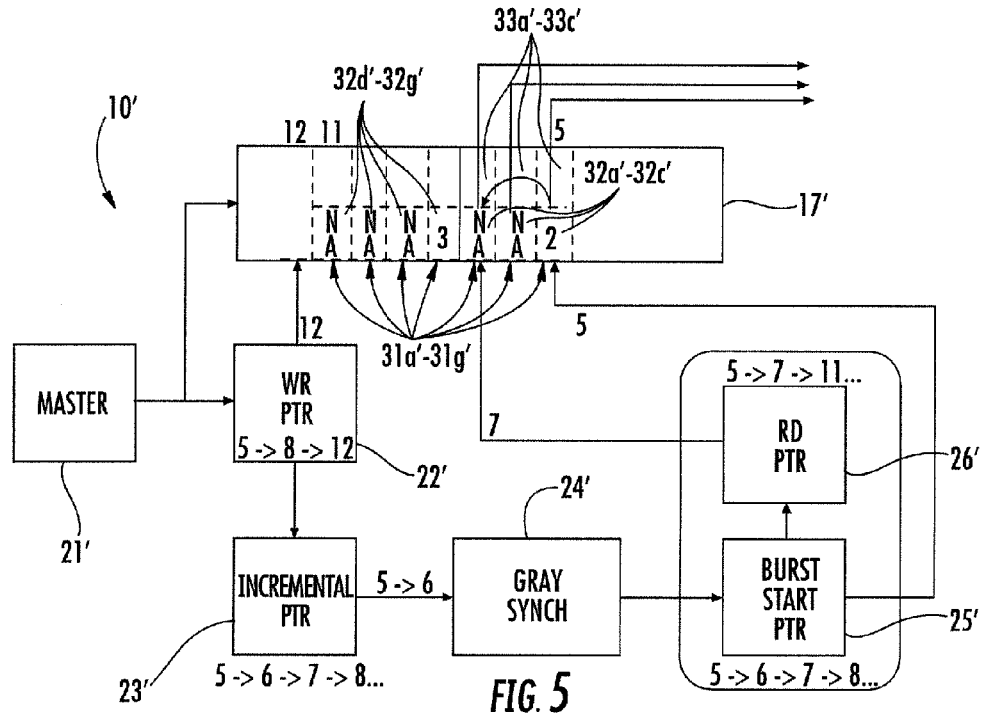
FIG. 5 is a schematic diagram of another embodiment of the bi-synchronous electronic device, according to the present disclosure.

Referring now additionally to FIG. 5, another embodiment of the bi-synchronous electronic device 10' is now described. In this embodiment of the bi-synchronous electronic device 10', those elements already discussed above with respect to FIGS. 3-4C are given prime notation and most require no further discussion herein. This embodiment differs from the previous embodiment in that this bi-synchronous electronic device 10' illustratively includes the first digital circuit 11' configured to write the burst indicator as a field value 31$a$', 31$g$'. The field value 31$a$', 31$g$' illustratively includes a memory value 33$a$'-33$g$', and a burst value 32$a$', 32$d$' indicating a length of the data burst. In this embodiment, the second digital circuit 13' is configured to read multiple field values from the FIFO memory circuit 12' in parallel. The first digital circuit 11' is configured to write at a plurality of locations in the FIFO memory circuit 12' in a single clock cycle of the first clock signal.

The embodiment of FIG. 5 has several advantages. For example, the first digital circuit 11' can process burst-like traffic and write it all at once (more than one location pushed into the FIFO memory circuit 12' in a single write/first clock cycle). Upon writing to the FIFO memory circuit 12', memory locations 31$a$'-31$g$' are tagged with a "boost flag." The destination (i.e. the second digital circuit 13') receives a reference pointer (burst start pointer) through Gray encoding of a shadow pointer that is updated as a sequential code (incremental pointer) chasing the real (jumping) write pointer. The destination is able to use the burst start pointer to detect the start point of the burst. The start point of the burst can be overcome by the read pointer, and the boost flag is used by the read side to detect the end of the burst and to collect all (or a part of) the burst and to deploy it. The slave side can move to any location within the burst boundaries without any risk for metastability. There is no need for the receiver side to wait for a slower master to send all the pointer values before collecting the burst. The same burst-like traffic shape can be kept at the destination.

In FIG. 5, the write pointer used to load the data in the FIFO memory circuit 12' is jumping from memory location 5 to 8. The incremental pointer follows the write pointer one step at a time (5, 6, 7, 8), and the write pointer can write more bursts in the meanwhile (jumping to 12). The read size recognizes the burst start pointer (5) when the synchronized pointer exceeds the last read location (4). The extra field allows the read side to fetch data from the FIFO up to location (corresponding to the burst start pointer plus the unsigned integer value of the tag). The second burst can be read as soon the burst start pointer reaches location 8. With this approach, the FIFO memory circuit 12' locations indicated by the tag field can be read in parallel.

Figure 6:
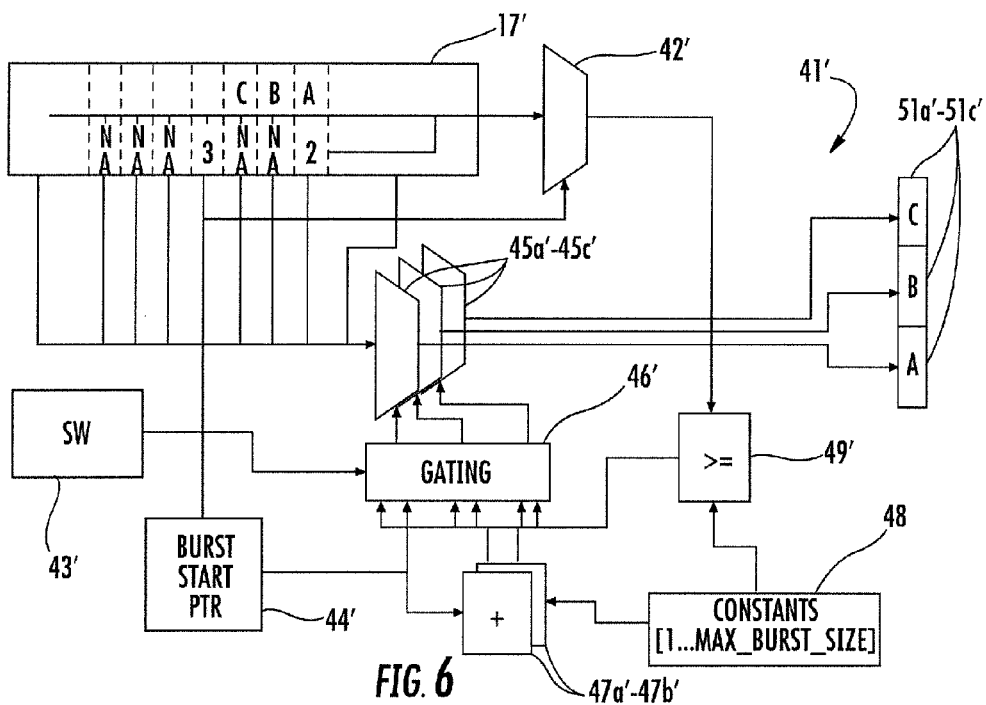
FIG. 6 is a detailed schematic diagram of the bi-synchronous electronic device of FIG. 5.

Referring now to FIG. 6, an exemplary hardware embodiment 41' of bi-synchronous electronic device 10' is now described. This embodiment 41' illustratively includes a multiplexer 42' coupled to the memory core 17', and a ">=" block 49' coupled to the multiplexer. This embodiment 41' illustratively includes a software control block 43', a gating block 46' coupled to the software control block, a burst start pointer block 44' coupled to the multiplexer, a constants block 48' providing operation parameters, and summation blocks 47$a$'-47$b$' coupled to the constants block and the burst start pointer block. This embodiment 41' illustratively includes a plurality of multiplexers 45$a$'-45$c$' coupled to the memory core 17' and the gating block 46', and a plurality of outputs 51$a$'-51$c$' for providing the memory values from the memory core 17'.

In particular, the multiplexer 42' retrieves the pointed burst length field from the FIFO. The burst length is compared at the ">=" block 49' to implementation-specific constants (at the constants block 48'). The burst start pointer block 44' is added to the constants, and the results of sum and comparison are used to select/gate (gating block 46') on a location basis. The selection can take optional software (software control block 43') programming (a register) into account. The selected burst locations are retrieved from the FIFO through the plurality of multiplexers 45$a$'-45$c$' and sent to the plurality of outputs 51$a$'-51$c$'.

The embodiment 41' permits a max burst size constant value and software-programmable quality of service (QoS) to allow the receiver to collect any number of locations within the available burst, according to design constraints and/or bandwidth requirements. In this embodiment, the boost flag/field acts a synchronization qualifier (gating of MUX selectors). The embodiment 41' behaves similar to a multi-clock upsize data converter (i.e. one location on the receiver side corresponds to a larger number of locations on the transmitter side).

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A bi-synchronous electronic device comprising:
   a first-in-first-out (FIFO) memory circuit configured to store data and comprising processing circuitry, and a memory core coupled to said processing circuitry;
   a first digital circuit coupled to said FIFO memory circuit and configured to
      operate based upon a first clock signal and a write pointer,
      write a data burst to said memory core of said FIFO memory circuit, thereby causing a jump in the write pointer to a new position, and
      write a burst indicator to said memory core of said FIFO memory circuit, the burst indicator being associated with the new position in said FIFO memory circuit; and
   a second digital circuit coupled to said FIFO memory circuit and configured to
      operate based upon a second clock signal different from the first clock signal,
      read from said FIFO memory circuit based upon a read pointer, and
      synchronize the read pointer to the write pointer based upon the burst indicator.

2. The bi-synchronous electronic device of claim 1 wherein said first digital circuit is configured to write the burst indicator as a flag bit.

3. The bi-synchronous electronic device of claim 1 wherein said first digital circuit is configured to write the burst indicator as a field value.

4. The bi-synchronous electronic device of claim 3 wherein the field value comprises a memory value, and a burst value indicating a length of the data burst.

5. The bi-synchronous electronic device of claim 3 wherein said second digital circuit is configured to read multiple field values from said FIFO memory circuit in parallel.

6. The bi-synchronous electronic device of claim 1 wherein said first digital circuit is configured to write at a plurality of locations in said FIFO memory circuit in a single clock cycle of the first clock signal.

7. The bi-synchronous electronic device of claim 1 wherein the jump in the write pointer to the new position comprises a non-consecutive jump from a current position.

8. The bi-synchronous electronic device of claim 1 wherein said memory core is configured to store data for transfer between said first and second digital circuits.

9. The bi-synchronous electronic device of claim 1 wherein said FIFO memory circuit comprises a 16-128 bit bi-synchronous FIFO memory.

10. A bi-synchronous electronic device comprising:
    a first-in-first-out (FIFO) memory circuit configured to store data and comprising processing circuitry, and a memory core coupled to said processing circuitry;
    a first digital circuit coupled to said FIFO memory circuit and configured to
       operate based upon a first clock signal and a write pointer,
       write a data burst to said memory core of said FIFO memory circuit, thereby causing a jump in the write pointer to a new position, the jump in the write pointer to the new position comprising a non-consecutive jump from a current position,
       write at a plurality of locations in said FIFO memory circuit in a single clock cycle of the first clock signal, and
       write a burst indicator to said memory core of said FIFO memory circuit, the burst indicator being associated with the new position in said FIFO memory circuit; and
    a second digital circuit coupled to said FIFO memory circuit and configured to
       operate based upon a second clock signal different from the first clock signal,
       read from said FIFO memory circuit based upon a read pointer, and
       synchronize the read pointer to the write pointer based upon the burst indicator.

11. The bi-synchronous electronic device of claim 10 wherein said first digital circuit is configured to write the burst indicator as a flag bit.

12. The bi-synchronous electronic device of claim 10 wherein said first digital circuit is configured to write the burst indicator as a field value.

13. The bi-synchronous electronic device of claim 12 wherein the field value comprises a memory value, and a burst value indicating a length of the data burst.

14. The bi-synchronous electronic device of claim 12 wherein said second digital circuit is configured to read multiple field values from said FIFO memory circuit in parallel.

15. The bi-synchronous electronic device of claim 10 wherein said memory core is configured to store data for transfer between said first and second digital circuits.

16. A method of operating a bi-synchronous electronic device comprising a first-in-first-out (FIFO) memory circuit comprising processing circuitry, and a memory core coupled to the processing circuitry, the method comprising:
    using a first digital circuit coupled to the FIFO memory circuit to
       operate based upon a first clock signal and a write pointer,
       write a data burst to the memory core of the FIFO memory circuit, thereby causing a jump in the write pointer to a new position, and
       write a burst indicator to the memory core of the FIFO memory circuit, the burst indicator being associated with the new position in the FIFO memory circuit; and
    using a second digital circuit coupled to the FIFO memory circuit to
       operate based upon a second clock signal different from the first clock signal,
       read from the FIFO memory circuit based upon a read pointer, and
       synchronize the read pointer to the write pointer based upon the burst indicator.

17. The method of claim 16 further comprising using the first digital circuit to write the burst indicator as a flag bit.

18. The method of claim 16 further comprising using the first digital circuit to write the burst indicator as a field value.

19. The method of claim 18 wherein the field value comprises a memory value, and a burst value indicating a length of the data burst.

20. The method of claim 18 further comprising using the second digital circuit to read multiple field values from the FIFO memory circuit in parallel.

21. The method of claim 16 further comprising using the first digital circuit to write at a plurality of locations in the FIFO memory circuit in a single clock cycle of the first clock signal.

22. The method of claim 16 wherein the jump in the write pointer to the new position comprises a non-consecutive jump from a current position.

* * * * *